United States Patent

Maiocchi et al.

[11] Patent Number: 5,838,128
[45] Date of Patent: Nov. 17, 1998

[54] RECONSTRUCTION OF BEMF SIGNALS FOR SYNCHRONIZING THE DRIVING OF BRUSHLESS- SENSORLESS MOTORS BY MEANS OF PREDEFINED DRIVING SIGNALS

[75] Inventors: Giuseppe Maiocchi, Villa Guardia; Marco Viti, Sesto S. Giovanni, both of Italy

[73] Assignee: SGS-Thomson Microelectronics S.r.I., Agrate Brianza, Italy

[21] Appl. No.: 901,611

[22] Filed: Jul. 28, 1997

[30] Foreign Application Priority Data

Aug. 1, 1996 [EP] European Pat. Off. ............ 96830440

[51] Int. Cl.⁶ .................................................. H02P 6/18
[52] U.S. Cl. .................. 318/439; 318/459; 318/705; 318/721
[58] Field of Search ................................. 318/138, 254, 318/439, 459, 500, 705, 720, 721, 724; 388/928.1

[56] References Cited

U.S. PATENT DOCUMENTS

| | | | |
|---|---|---|---|
| 4,409,534 | 10/1983 | Bose | 318/811 |
| 4,618,808 | 10/1986 | Ish-Shalom et al. | 318/696 |
| 5,023,527 | 6/1991 | Erdman et al. | 318/254 |
| 5,068,582 | 11/1991 | Scott | 318/254 |
| 5,221,881 | 6/1993 | Cameron | 318/254 |
| 5,367,234 | 11/1994 | DiTucci | 318/254 |

FOREIGN PATENT DOCUMENTS

| | | |
|---|---|---|
| 0 324 396 A2 | 7/1989 | European Pat. Off. |
| 2 576 469 | 7/1986 | France |

*Primary Examiner*—Bentsu Ro
*Attorney, Agent, or Firm*—Allen, Dyer, Doppelt, Milbrath & Gilchrist, P.A.

[57] ABSTRACT

The sensing of BEMF signals in the motor's windings for synchronizing the phase switchings, in driving a brushless and sensorless motor with predefined constant voltage or current values or predefined voltage or current profiles stored permanently in a memory, is greatly simplified through a reconstruction technique that avails itself of the knowledge of the predefined drive values. The sensing does not require access to the center star point and is performed by sensing either the voltage difference between the terminals of two windings or of the current flowing in two windings, depending on whether a current or voltage mode is employed.

16 Claims, 14 Drawing Sheets

BRUSHLESS CONFIGURATION WINDINGS
AND CONSTANT PROFILE CURRENTS

TRANSCONDUCTANCE AND CONTROL
FOR CONSTANT PROFILE
CURRENT LOOP

SENSING OF BEMF SIGNAL
OF PHASE C

FLATTEST MOTOR TORQUE AVAILABLE WITH CONSTANT CURRENT PROFILES NEW PHASE MUST BE EXCITED 30 ELECTRICAL DEGREES FROM ZC ASSERTION

RECONSTRUCTION OF BEMF SIGNALS FOR SYNCHRONIZING THE DRIVING OF BRUSHLESS- SENSORLESS MOTORS BY MEANS OF PREDEFINED DRIVING SIGNALS

FIELD OF THE INVENTION

The present invention relates to techniques for driving an electronically switched sensorless motor. More particularly, this invention relates to a monitoring and reconstructing technique of induced signals that reveal the angular position of the rotor.

BACKGROUND OF THE INVENTION

Electronically switched DC motors, as well as stepper motors or in general brushless motors, are used in innumerable control and regulation applications and also as mass memory drive systems in the case of rotating storage media, such as hard disks, floppy disks, optical disks, CD-ROMs, as well as in case of linear media, such as tape streamers and the like. Commonly these motors are polyphase motors in a "star" configuration. Quite common is the case of a motor having three phase windings connected in a star configuration and defining six different switching phases and a P number of poles. In this case, there will be a number 3*P of equilibrium points in a complete revolution of the rotor.

In the present text, each excitation phase will be indicated according to a standard notation by two capital letters. The first capital letter (for example, A, B or C) defines the winding through which the current conventionally flows from the respective supply terminal towards the star center (CT) and the second capital letter, preceded by the sign (!), designates the winding through which the current, conventionally coming from the star center (CT), flows toward the supply terminal of the relative winding.

A scheme of excitation for the six phases A!B, A!C, B!C, B!A, C!A, C!B, referred to the case of a three winding motor is shown in FIG. 1. These brushless motors are commonly driven using an integrated circuit whose output stage is represented by a polyphase full-wave bridge circuit, which in the case of a three-phase motor may employ six bipolar (BJT) or field effect transistors (MOS) power transistors as shown in FIG. 2. Commonly the motor current is linearly controlled through a transconductance loop, as shown in FIG. 3, in the case of a current mode control. Of course it is also possible to drive the motor in a voltage mode.

During a certain switching phase of the motor, the "sourcing" power transistor is forced into full conduction (that is to saturation in case of an MOS device) whereas the "sinking" power transistor operates as an element of transconductance, according to the scheme of FIG. 3, which refers to the use of MOS type power devices. With reference to FIG. 3, the motor current may be expressed as follows:

$$Imotor = \frac{Vref}{Gv * Rs}$$

where Vref is the control voltage that may be supplied by a motor's speed control phase-locked loop (PLL) that regulates the speed of the motor. Gv is the voltage gain of the sensing amplifier while Rs is the current sensing resistor.

In the prior art, the voltage Vref is regulated at a certain level by the PLL control loop to regulate the current absorbed by the motor in maintaining a certain speed. Of course, the PLL control loop acts on the Vref value by varying its instantaneous value about a certain mean value to compensate for instantaneous load-torque variations.

According to a certain driving scheme, during each excitation phase, the motor current may be regulated at certain level, substantially to a constant level (± Imotor) as shown in the diagram of FIG. 4. As it can be noticed in FIG. 4, at any instant, one of the three phase windings of the motor is de-energized. The switching to a next phase of the sequence, for instance from phase A!B to phase B!C, must be synchronized with the rotor position to obtain the maximum possible torque at the motor shaft.

According to the prior art, this synchronization can be assured by employing appropriate sensors of the rotor position, such as, for example, Hall effect sensors. According to an alternative that has become more and more common, the same result is obtained by detecting and processing back electromotive force (BEMF) signals, that are induced in the motor phase windings by the rotor's rotation. The processing includes detecting the crossing of a predetermined level (zero crossing) by the BEMF signal, which typically has a periodic waveform, relevant to the phase winding that is momentarily not excited by a driving current, according to a detection scheme as shown in FIG. 5 for the A!B excitation phase.

These systems, as described in numerous documents, generate a pulse at each zero crossing, that is used by the driving system to actuate a new phase switching. The case of a star-connected three-phase winding motor, defining six distinct switching phases for a complete revolution of the rotor, is shown in FIG. 6. The monitoring circuitry of the respective BEMFs in the three windings of the motor and the relative circuitry for recognition and processing of the zero crossing events, produces the logic pulse ZC, which is set at each zero crossing and reset following its assertion by the synchronization logic circuitry.

In the example considered, it may be noticed that to obtain the maximum available torque, the next phase must be excited theoretically after 30 electrical degrees from the zero cross instance (leading edge of ZC). Being that the zero cross signal is strictly correlated to the motor rotor position and being that this relation time is invariant, the delay between the instance of a zero cross and the optimum instant at which the new phase of motor driving should be switched is time invariant as well. Therefore once defined, every phase is excited with this identical delay from the zero cross instant.

On the other hand, according to an advanced driving technique, it is contemplated to be forcing excitation currents in the motor windings, not of a substantially constant level, but according to a certain profile, that can be pre-defined, digitized and stored in digital form in a nonvolatile static memory, such as, for instance, an EPROM or EEPROM memory. The pre-defined profile can be a sinusoid or generally the result of a Fourier summation of harmonics of a fundamental frequency. Therefore, according to this new technique which permits optimization of the motor torque characteristics, the current forced in the motor windings is not constant during each excitation phase, but follows the profile of a cyclic or alternating waveform.

This technique is described and shown in the European patent application No. 96830180.4 and 96830190.3 filed respectively on Mar. 29 and Apr. 4, 1996, in the name of the same assignee and whose content is to be considered included herein.

Substantially, according to this technique, the complete current profile, having of course a cyclic or alternating form, is stored in a number of sequences, as many as the number of switching phases, each sequence consisting of a number N of samples. Each sequence which, according to that technique, substitutes the constant level of phase driving the prior techniques, is converted into an analog signal by a digital/analog converter which drives the output power stage, for instance a transconductance feedback stage as the one shown in FIG. 3. In practice, the converted profile segment provides the driving Vref signal to the respective power stage during a phase.

Naturally, even according to this technique it is necessary to assure a perfect synchronization of phase switching with the rotor position, so that following each assertion of the ZC signal, a new sequence of N digital samples is read and converted. The value of each sample is stored as a digital datum (word) composed of a number n of bits.

At each switching phase the level of the currents or of the current forced in the relevant motor phase windings is not constant but varies in intensity following the profile defined by the respective sequence of samples. This causes in practice that there will no longer be instants at which a certain phase winding of the motor is not excited (crossed by a current), and, therefore, amenable to permit an easy discrimination of the zero-cross event by the back-electromotive-force (BEMF) signal BEMF induced on such a momentarily de-energized winding. This is due to the fact that, since the excitation current is no longer constant, the voltage detected at the ends of each motor phase winding is the sum of distinct contributions or terms, given by the following expression:

$$Vd=L*dI/dt+R*I+BEMF$$

where L is the winding inductance, R the resistance and I the instantaneous value of the current.

Assuming that the profile of the current that is forced in the motor windings is sinusoidal or consists of a Fourier series of harmonics of a base frequency, it is easy to verify that the maximum torque is produced when the current (or the fundamental harmonic of the Fourier series) is perfectly in phase with the BEMF induced on the same winding. However, due to the term L*dI/dt, the signal Vd that is detected across a winding will be anticipated in respect to the BEMF term. This peculiar condition of operation is depicted in the diagrams of FIG. 7.

The same technical problem of correctly detecting the BEMF signal also exists when driving a stepper motor in a closed loop mode. The problem of a correct detection of the optimal switching instant under these conditions may be overcome by two distinct approaches. According to a first approach, it is possible to optimize a certain delay in effecting the switching after a command caused by the detection of a false zero-cross (anticipated in respect to the real zero-cross instant of the BEMF signal). A second approach includes undertaking an analog reconstruction of the real BEMF signal so as to determine the exact zero-cross instant.

The article "Self-Synchronization of Permanent Magnet Energized Stepper Motor with Detection of Position by Evaluation of the BEMF" by Werner Siefert (Berger Lahr GmbH), PCIM, November 1985, pages 48–54, discloses a self-synchronization system of a two-phase stepper motor realized through the reconstruction of the BEMF signals by a dedicated sensing circuit.

According to these known BEMF signals reconstruction techniques it is necessary to detect the voltage and current on each phase winding of the motor which also makes necessary access to the star center node and relatively complex monitoring and signal processing circuitry.

SUMMARY OF THE INVENTION

The main object of the present invention is that of offering a simplified method and circuit for reconstructing a BEMF signal to implement a synchronization of the motor's phase switching.

According to a first and fundamental aspect of the invention, depending on whether the motor is driven in a voltage or current mode, a correct reconstruction of the BEMF signal is realized by monitoring, in the first case, the current crossing two different motor windings or, in the second case, the voltage difference between the terminals of two different motor windings. In practice, the reconstruction system exploits the prior knowledge, in the first case, of the constant values or the predefined profiles of the driving voltages corresponding to the different motor windings during the different switching phases and, in the second case, of the constant value or pre-defined profiles of the currents forced through the respective motor winding during the various switching phases, for reconstructing the BEMF signal.

For example, by defining the following variables:
Rm:the resistance of a phase winding of the motor
Rs:the sense resistance for monitoring the current flowing in a phase winding of the motor.
Lm:the inductance of a phase winding of the motor
Ia and Ib:the currents flowing in the motor windings A and B, respectively.
Va:the voltage at the terminal of winding A;
Vb:the voltage at the terminal of winding B;
BEMFA:the Back-Electromotive-Force induced on winding A;
BEMFB:the Back-Electromotive-Force induced on winding B;
the following expression may be written:

$$Vb-Va=Lm*d(Ib-Ia)/dt+(Rm+Rs)*(Ib-Ia)+BEMFB-BEMFA$$

From the above equation we may obtain the difference between the two respective back-electromotive-forces induced on the two phase winding of the motor as indicated by the following equation:

$$BEMFA-BEMFB=(Rm-Rs)*(Ib-Ia)+Lm*D(Ia-Ib)/dt+Va-Vb$$

In case of driving the motor in a voltage mode, the values Va and Vb are pre-defined and their difference is known so that it is sufficient to sense the winding currents Ib and Ia. Vice versa, when referring to a motor driven in a current mode, the currents forced across the two windings Ia and Ib are pre-defined and their difference is known, then it is sufficient to sense the voltage difference on the terminals of the two windings A and B, that is, Va·Vb=Vd (for a star configuration). Thence, according to the present invention, it is no longer required to access the central node of the phase windings of the motor (CT). Moreover, the difference signal BEMFA-BEMFB has a larger amplitude than the single signals BEMFA or BEMFB, so that the signal/noise (s/n) ratio increases.

In practice, according to the system of the invention, it is satisfactory to sense either two winding currents or the voltage difference between the terminals of two phase windings of the motor. As well as simplifying the sensing of the signals required for the reconstruction of the BEMF signal, the system of the invention facilitates the adjustment of the constants terms of the equation above to satisfying the peculiar requirements of the applications as well as the introduction of delays or advancements of the zero-cross (ZC) of the reconstructed BEMF signal that to optimize the driving of the motor.

BRIEF DESCRIPTION OF THE DRAWINGS

The various aspects and advantages of the invention will become even clearer through the following description of some important embodiments and by referring to the attached drawings, wherein.

DETAILED DESCRIPTION OF THE PREFERRED EMBODIMENTS

The following description of important practical embodiments of the invention has the only purpose of illustrating how the invention may be practiced. Even though, as in the preamble portion, reference will continue to be made to a most common case of a three-phase motor, that is, having three windings connected in a star configuration, the indications given in the following description and in the annexed circuit diagrams are not to be considered as limitative. As it will be evident to any person skilled in the art, many of the architectural and circuital choices of the system of the invention may also be devised in a different manner, though functionally equivalent to those described, to adapt the system to particular applications.

Figure 1:
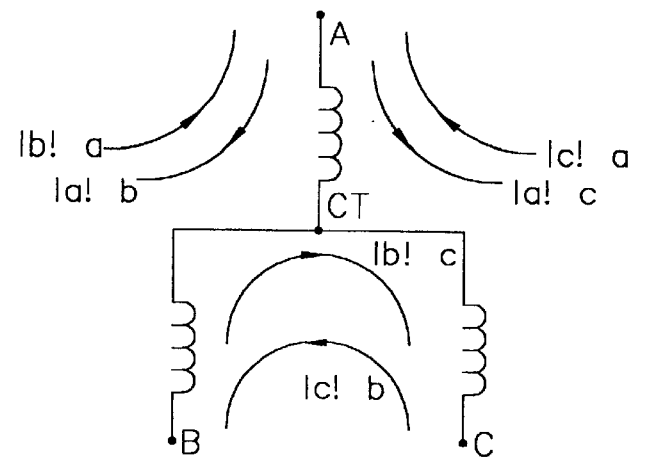
FIG. 1 is a diagram of the excitation currents, as already described above and as in the prior art.
Figure 2:
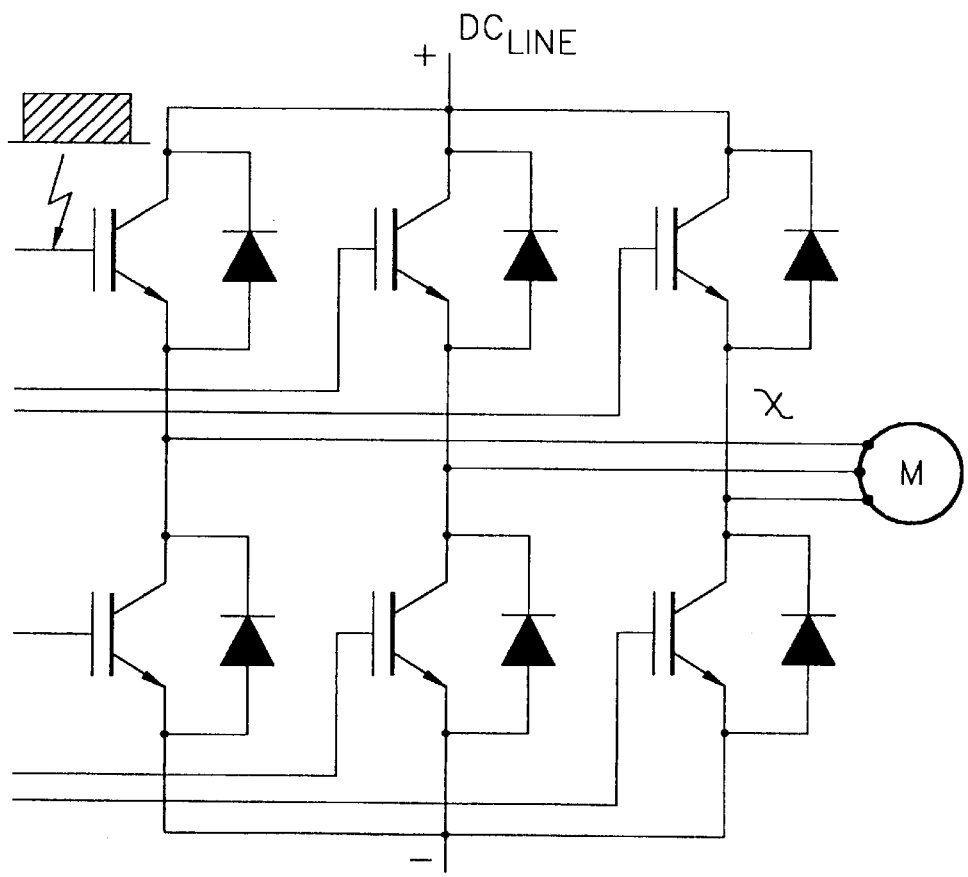
FIG. 2 depicts a three-phase bridge circuit as already described above and as in the prior art.
Figure 3:
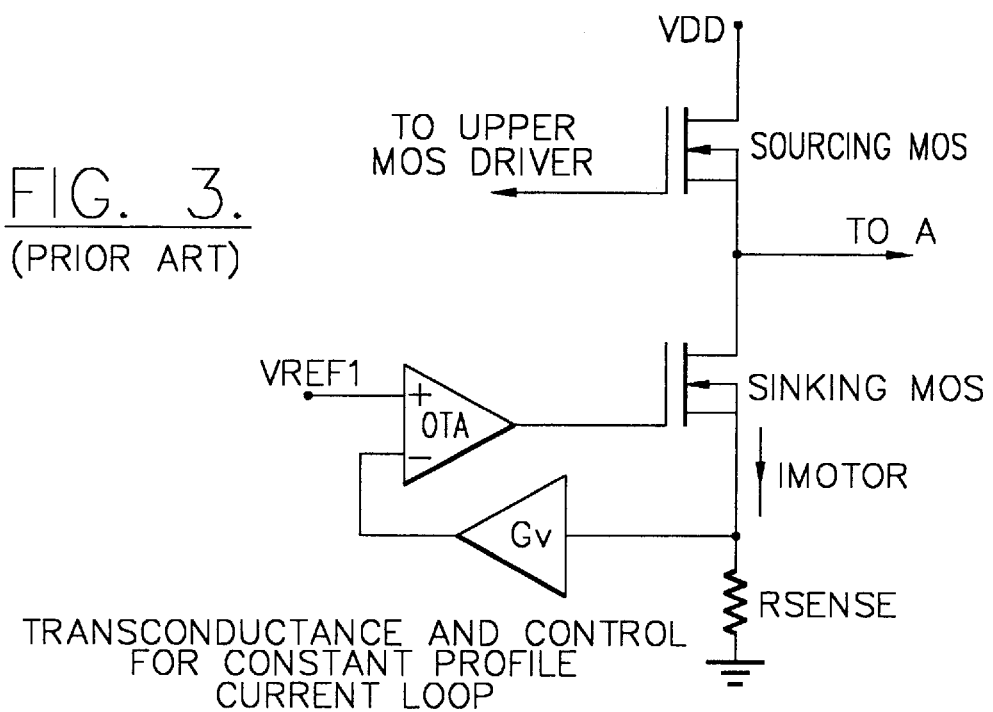
FIG. 3 depicts a transconductance linear control loop as already described above and as in the prior art.
Figure 5:
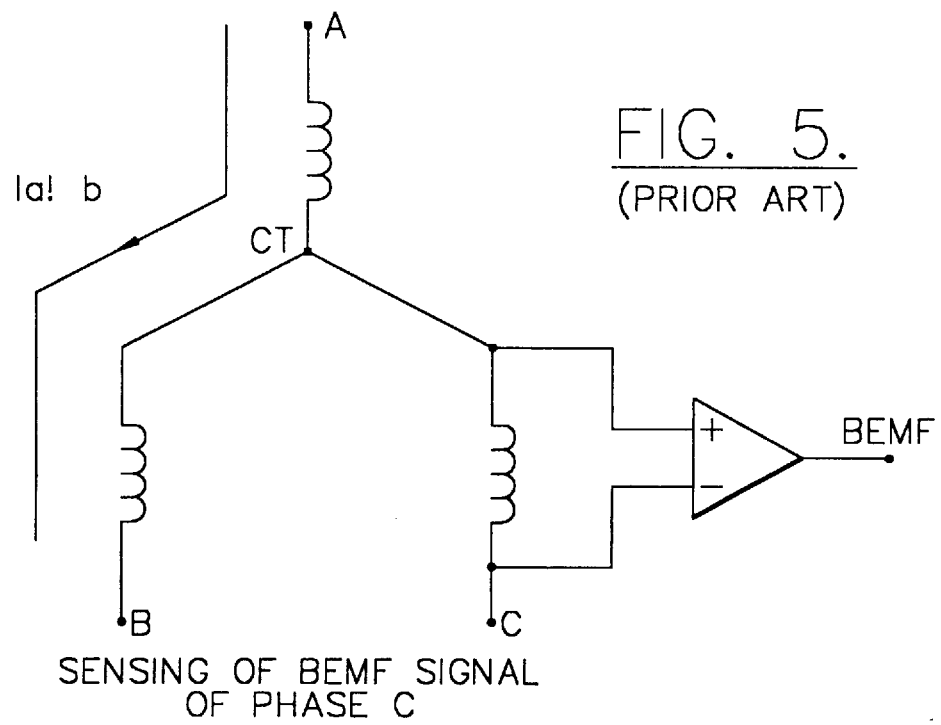
FIG. 5 shows a scheme for detecting a BEMF signal induced on a phase winding that is momentarily not crossed by any driving current, as already described above and as in the prior art.
Figure 4:
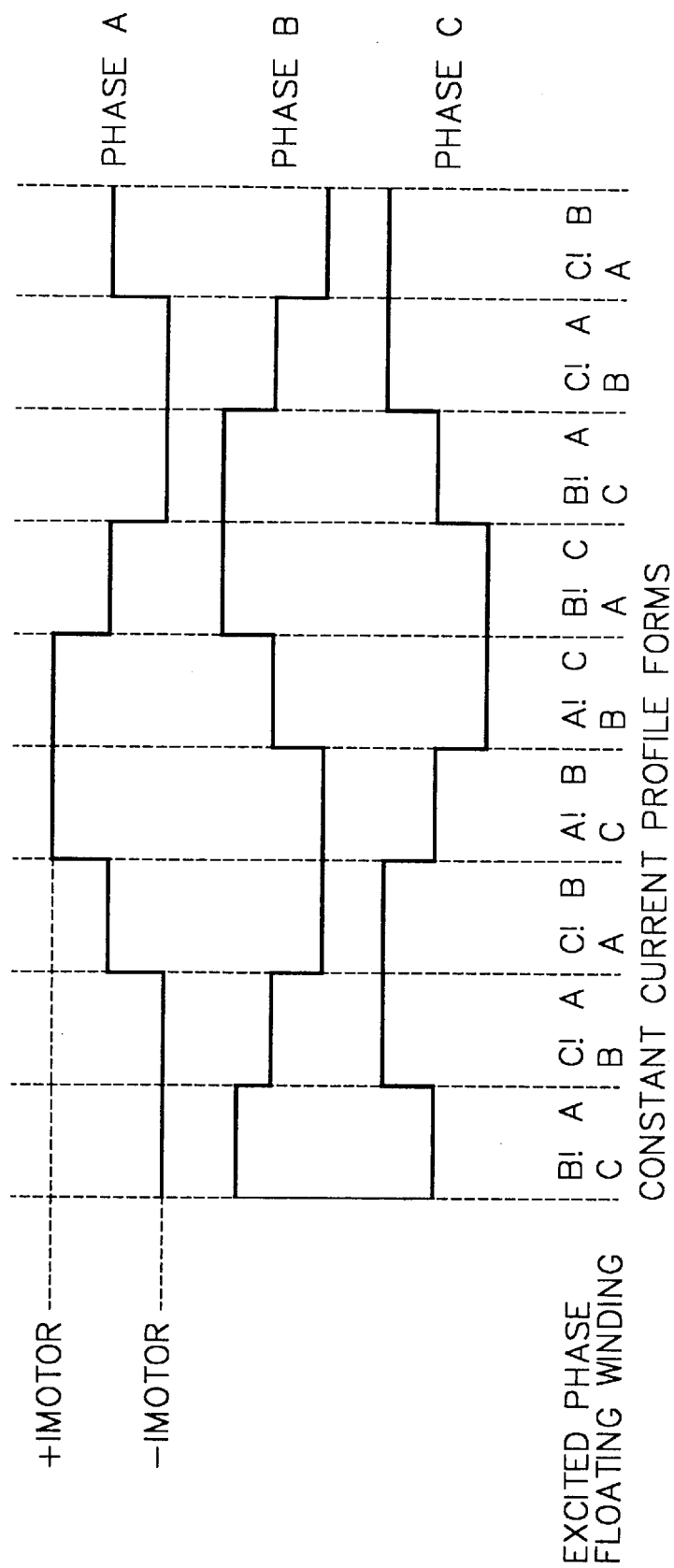
FIG. 4 depicts a constant level current mode driving scheme of constant level, as already described above and as in the prior art.
Figure 6:
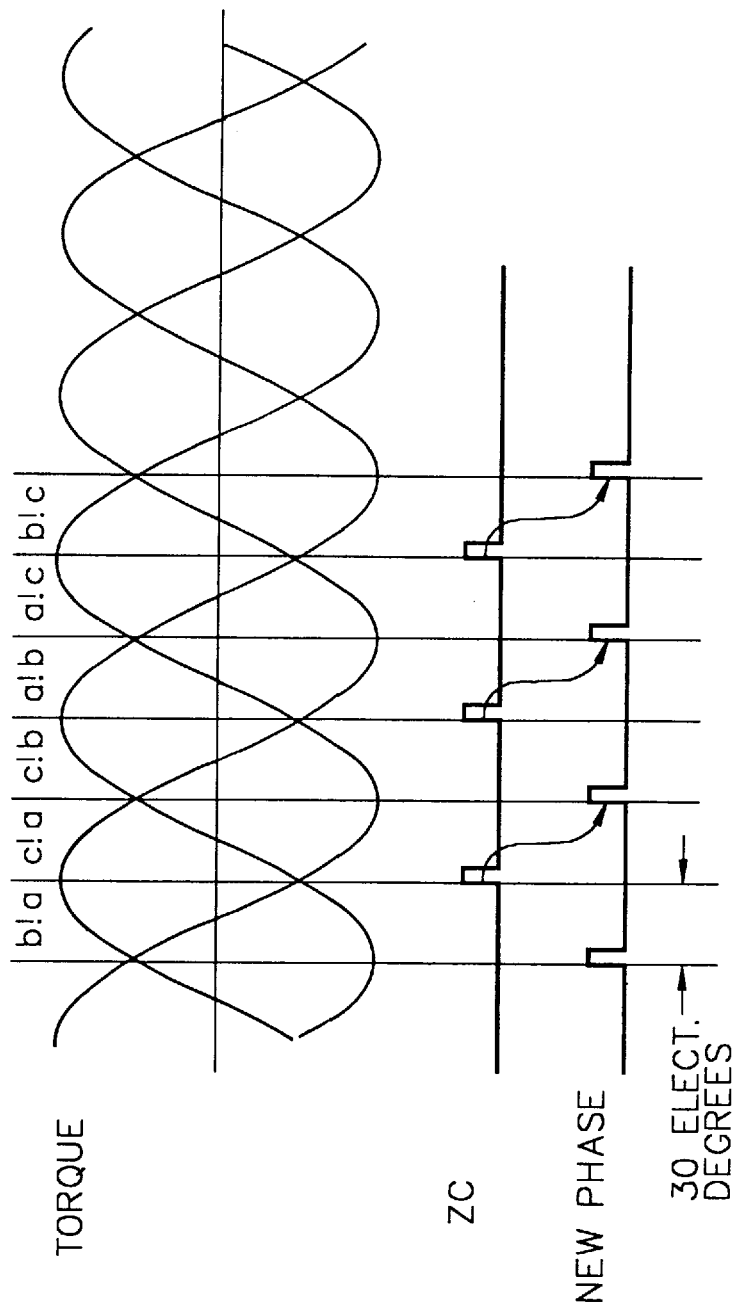
FIG. 6 shows by way of diagrams the phase switching scheme for a complete revolution, as already described above and as in the prior art.
Figure 7:
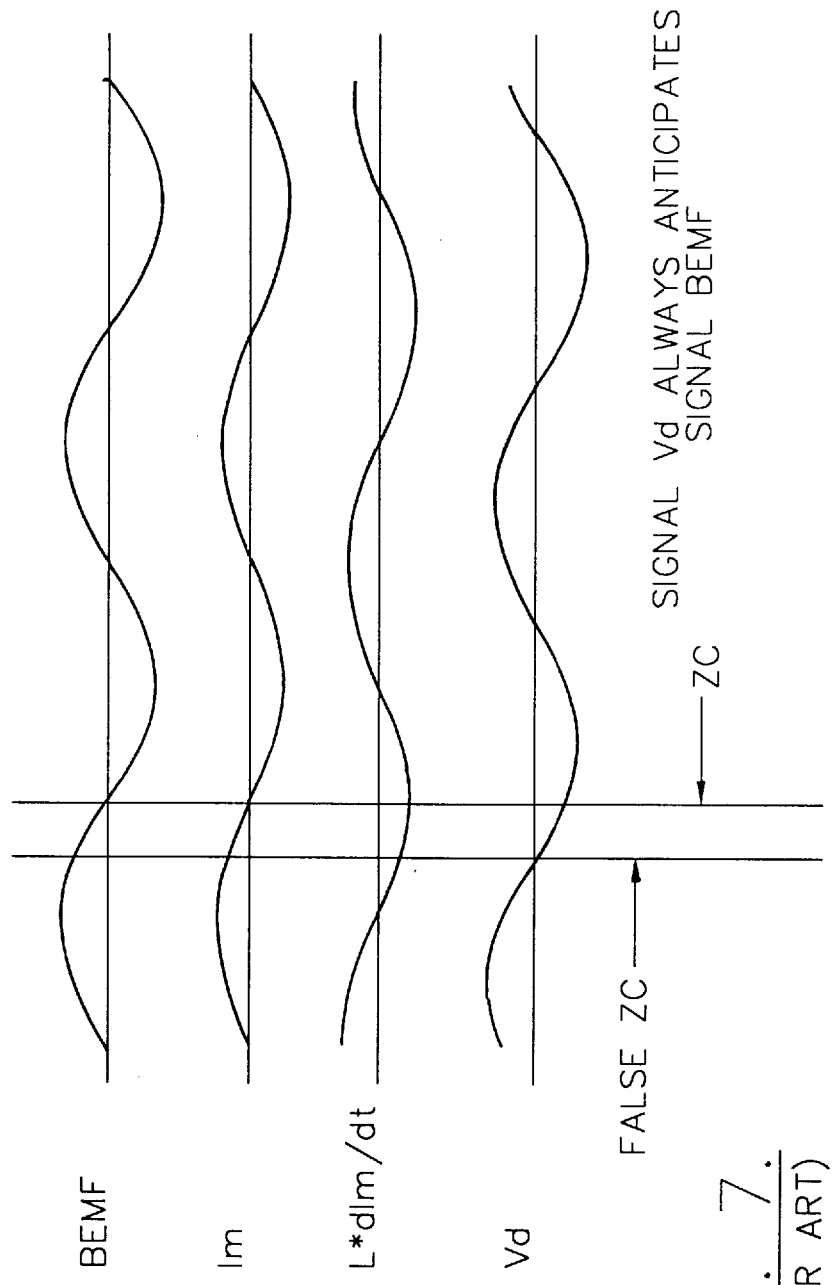
FIG. 7 highlights the fact that the voltage Vd anticipates the signal BEMF; as already mentioned above and as in the prior art.
Figure 8:
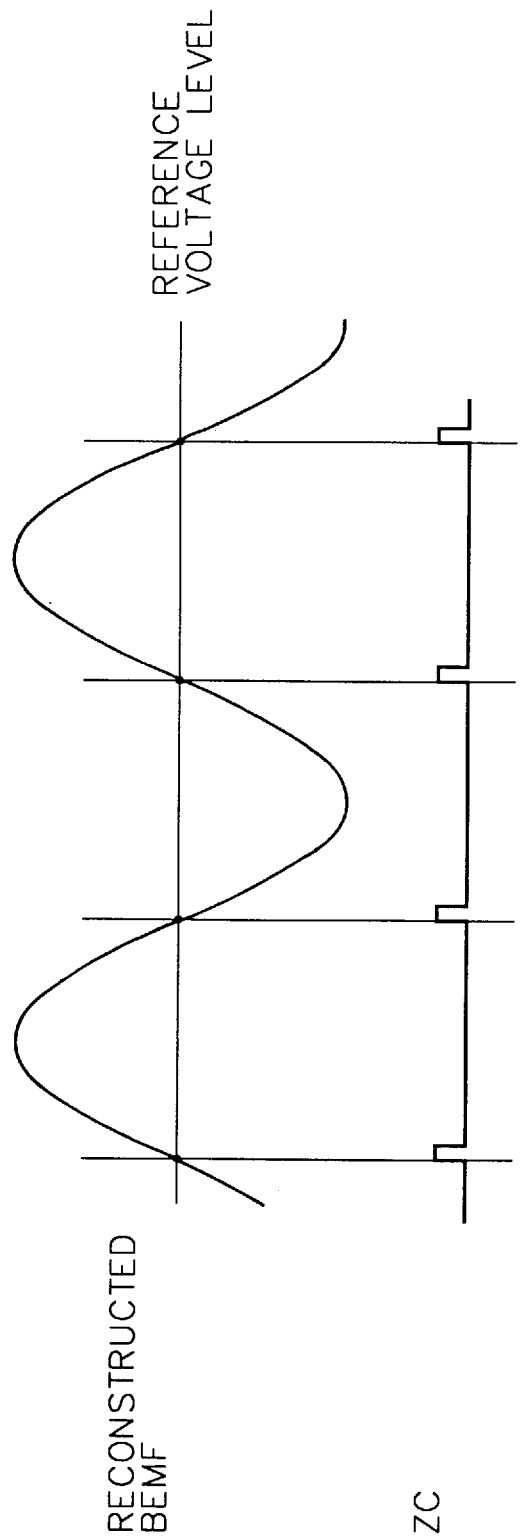
FIG. 8 shows the way a zero-cross pulse is generated from the reconstructed BEMF signal and as in the prior art.

The main aspect of the invention is that of reconstructing a difference signal of two BEMFs induced on two different motor windings, in other words a reconstructed signal the "zero-cross" instant of which is detected for producing a logic pulse ZC. Moreover, the system of the invention allows for the introduction of an eventual anticipation or delay in the generation of the logic pulse ZC so to produce a corrected ZC_SHIFT signal for optimizing the motor driving conditions. For instance, the insertion of a certain delay may serve to compensate the phase difference between current and voltage of a winding when the motor is driven in a voltage mode. As shown by way of diagrams in FIG. 8, the system of the invention is primarily aimed to generate a ZC signal, whose rising front coincides with the zero-cross instant of the reconstructed BEMF signal.

According to an important aspect of the invention, the constant values or more in general the pre-defined driving current or voltage profiles of the respective phase windings, during the entire switching phase, are digitized and stored in a static memory in the form of a sequence of digital samples stored as words of a certain number of bits. These pre-defined values are read at a certain memory scanning clock frequency, as a function of the speed of the motor, as more thoroughly described in the above cited European patent applications No.96830180.4 and No.96830190.3, whose content is herein incorporated by reference.

Figure 9:
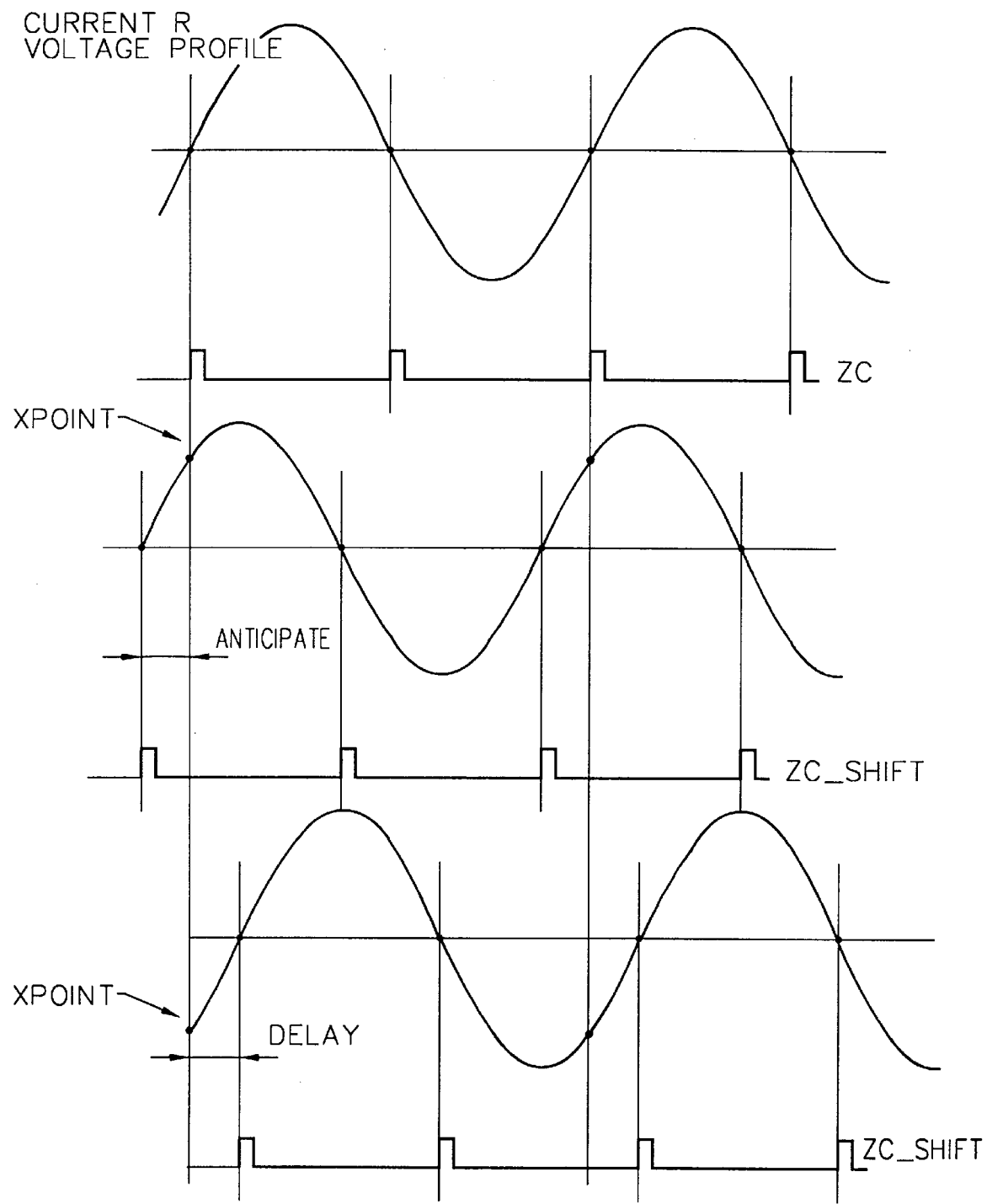
FIG. 9 shows the way a pre-defined driving voltage or current profile is synchronized with a delayed or anticipated switching command and as in the prior art.

As a consequence, the scanning of these sequences of pre-defined and stored digital values should occur in synchronism with the rotor's angular position and, as thoroughly explained in the above cited patent applications, during acceleration and deceleration phases, become of fundamental importance to ensure a punctual "recovering" of synchronism by commanding, at each phase switching of the motor, the scanning of a certain sequence of digitized samples. The scanning of which may be appropriately started from and/or terminated with a certain sample of the sequence different from the first sample or from the last sample, respectively, of the particular sequence of the entire cycle. This requisite is illustrated in the diagrams of FIG. 9.

The invention provides for a self-synchronization based upon the generation of a synchronization pulse ZC_SHIFT which, from case-to-case may be properly anticipated or delayed in respect of the zero-cross (ZC) pulse as generated upon sensing a zero-cross on the reconstructed (BEMFA-BEMFB) difference signal. The amount of delay or anticipation to be applied to the ZC as sensed on the reconstructed BEMFA-BEMFB signal, may be defined through a dedicated circuit, as described in the preceding European patent application No. 96830190.3.

In the ensuing description of a sample embodiment, reference is made to the case of a control system operating in a voltage mode, being understood that the same considerations also apply to a control system operating in a current mode. A further and evident consideration is that the methodology and architecture of the invention are valid either when the output power stage operates in a linear mode (for example, in case of a push-pull configuration) or when it operates in a PWM mode. In the latter case, a lowpass filter may be necessary to eliminate the PWM switching noise (spikes), in reconstruct the voltage difference signal BEMFA-BEMFB (that is, the difference between the respective BEMF signals induced on the phase windings A and B of the motor).

Normally, the cut-off frequency of such a lowpass filter may be chosen in a way of being at least a tenth lower than the fundamental frequency of the reconstructed BEMF signal. The consequent delay that may be introduced by a lowpass filter of this nature is in any case compensated by the delay (or anticipation) optimizing circuit of the so corrected ZC_SHIFT signal.

Figure 10:
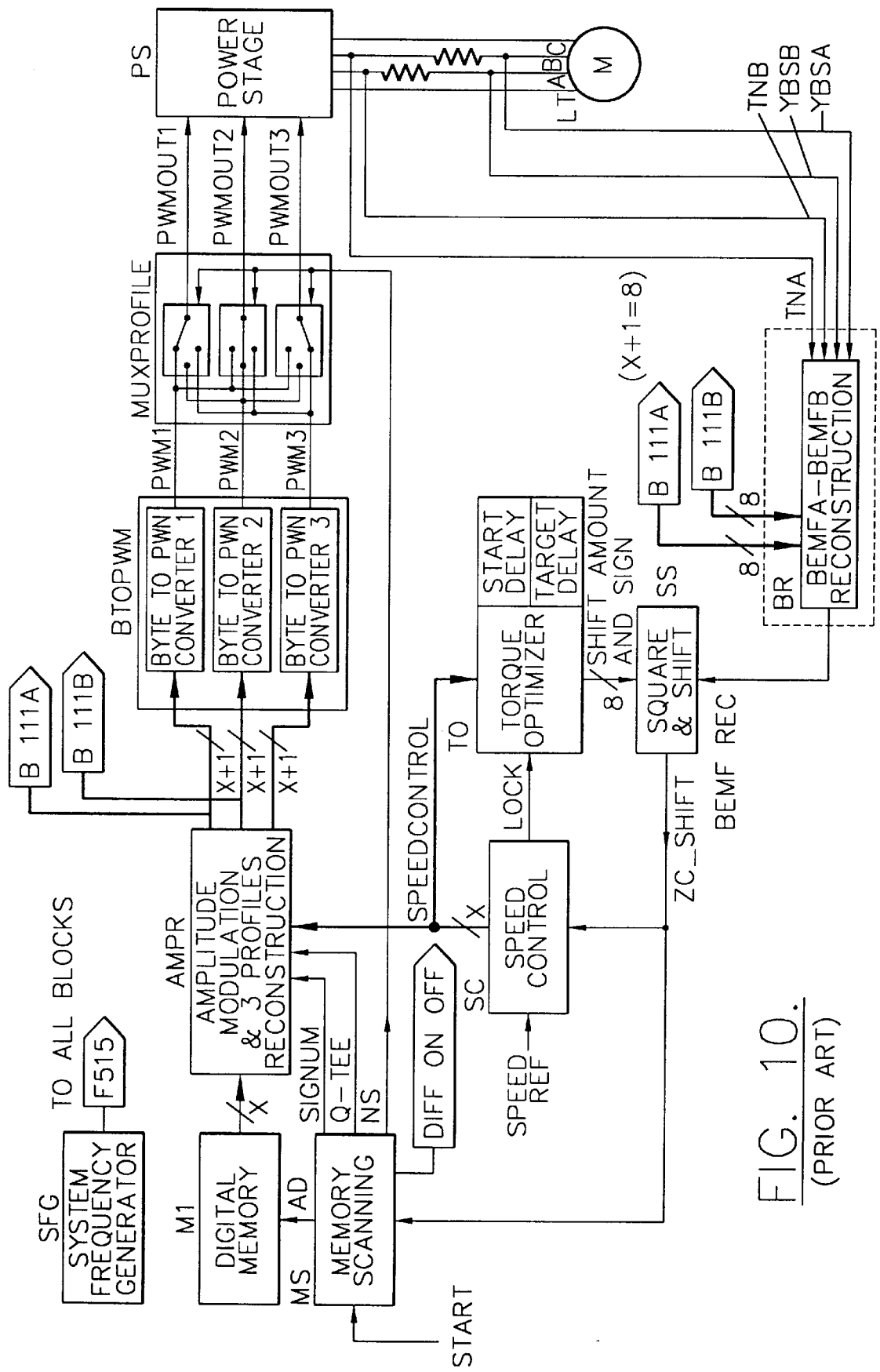
FIG. 10 is a block diagram of a prior art driving scheme for a DC brushless motor and as in the prior art.

FIG. 10 shows a high level block diagram of a whole driving system for a brushless motor, according to the already mentioned European Patent application No. 96830295.0 in which is incorporated the reconstructing block of the BEMFA-BEMFB signal made according to the present invention. The scheme of FIG. 10 shows the two signals B_INA and B_INB, that represent the pre-defined driving values of the respective phase windings A and B of the motor and which are used to obtain the relative driving voltages Va and Vb, as well as the presence of a sense resistor Rs in the corresponding phase windings of the motor for monitoring the respective currents Ia and Ib.

Figure 11:
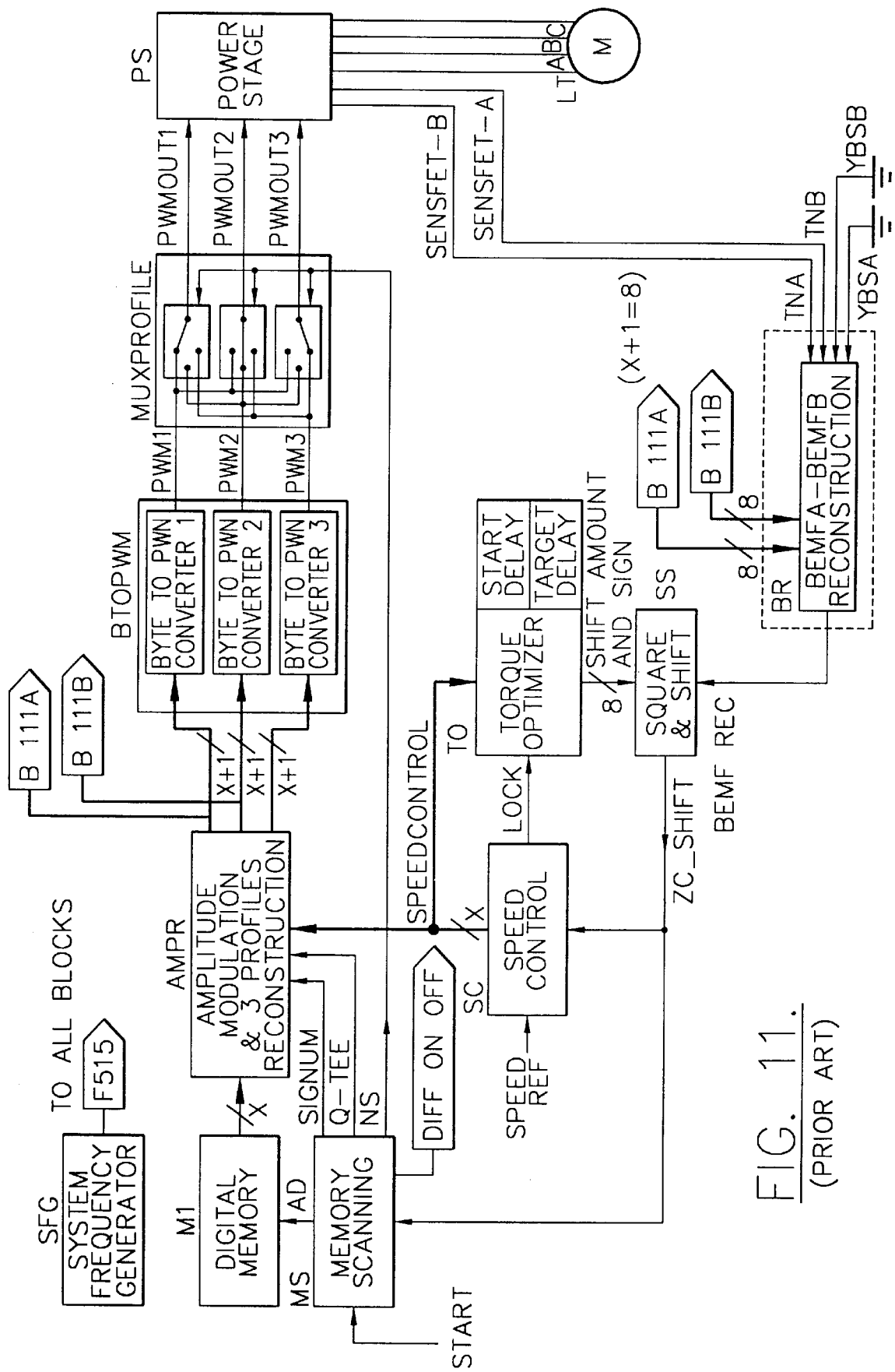
FIG. 11 shows an alternative block diagram for a system like that of FIG. 10 and as in the prior art.
Figure 12A:
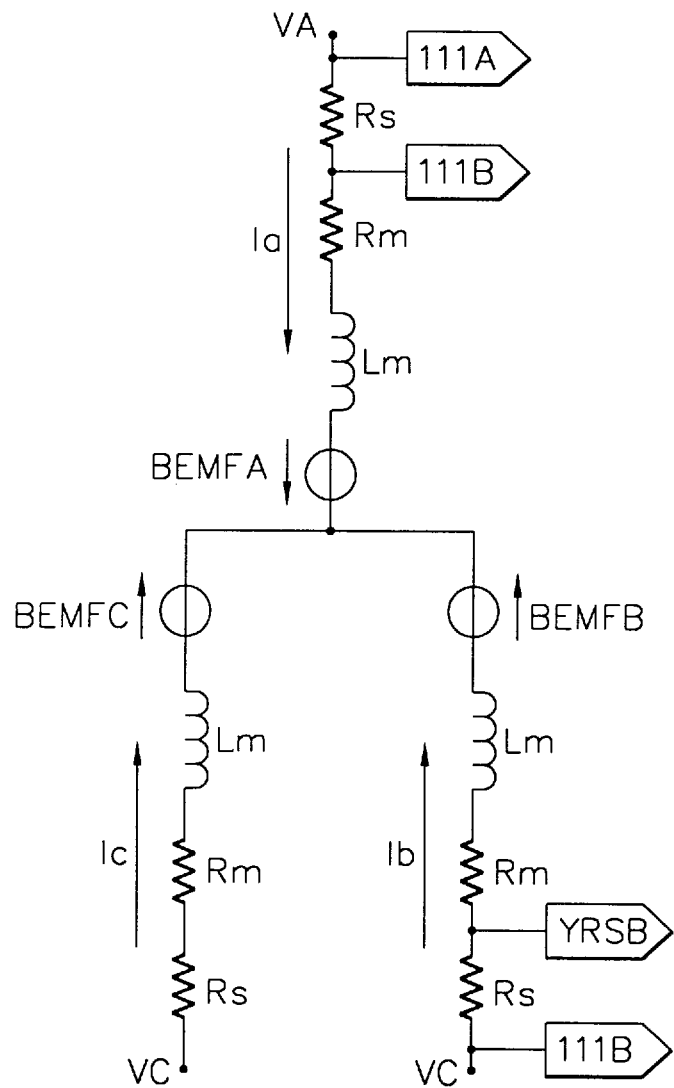
FIG. 12a and 12b shows the scheme of a BEMFA-BEMFB signal reconstructing circuit according to the present invention.

FIG. 11 is a scheme rather similar to that of FIG. 10 even though the two currents Ia and Ib are no longer read by using the sensing resistors connected in series to the windings, but instead, by using a sensing FET. The following description of an embodiment of the invention refers to the case whereby the currents of the motor's windings are monitored by means of sensing resistors Rs in series with the respective windings, according to the scheme shown in FIG. 12a.

Figure 12B:
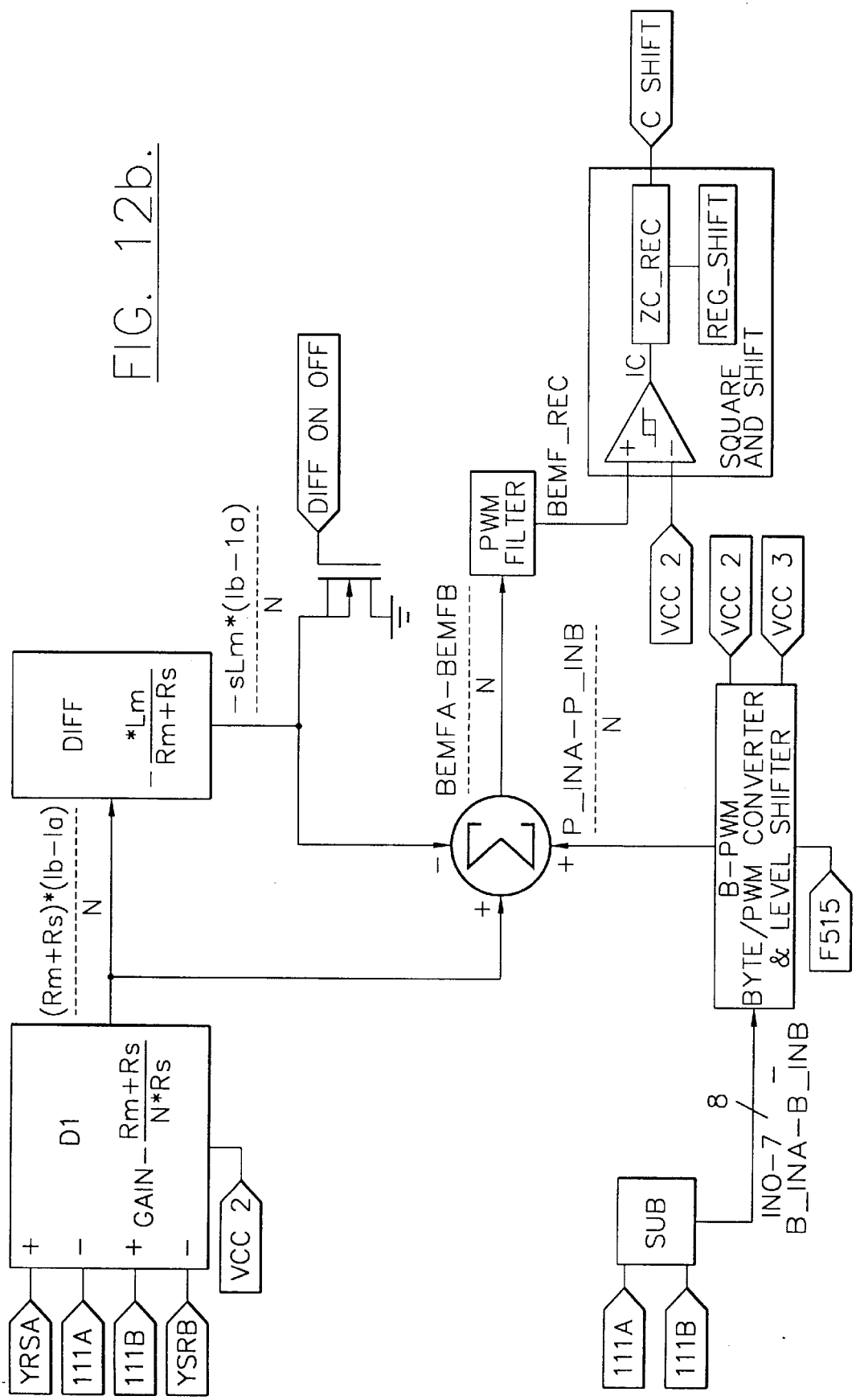

The architecture of the reconstructing circuit of the BEMFA-BEMFB signal according to the present invention is illustrated in FIG. 12b. The figure indicates the functions of the different blocks that operate the reconstruction. Because the Va-Vb voltage may swing from +Vcc to -Vcc (being Vcc the supply voltage) it may be necessary to scale down such a dynamic range to operate a reconstruction with a circuit supplied at Vcc. For this purpose, all the terms of the reconstruction equation 2), and thus the signals they refer to, may be preventively divided by N (a reconstruction amplitude scale factor) which, in the implemented embodiment, is assumed to be equal to 4. Likewise, the reconstructed signal BEMFA-BEMFB will have an amplitude scaled down by the same factor N=4.

The circuit block D1 comprising a differential stage, the inputs of which are directly coupled to the sensing resistors Rs of the currents flowing in the motor's winding's A and B. The gain of D1 is equal to (Rm+Rs)/N*Rs so that its output corresponds to (Rm+Rs)*(Ib-Ia)/N.

The output of D1 is the first term of the reconstruction equation 2) and the output signal is fed to the non-inverting input of the sum stage Σ, as well as to the DIFF block, whose gain is given by Lm/(Rm+Rs) and whose output signal is -sLm*(Ib-Ia)/N. The output of the differentiating block DIFF represents the second term of the reconstruction equation and being inverted by the DIFF stage, is fed to the inverting input of the summing stage (Σ). Since DIFF is essentially a high-pass filter, it may amplify the PWM switching noise.

At the start-up of the motor, since the frequency of the BEMFA-BEMFB signal is still relatively low, the "weight" of the differential term of the reconstruction equation 2) is proportionally small and then its contribution may be momentarily eliminated by forcing to ground the output of the DIFF block via a MOS transistor driven by a DIFF_on_off signal originating from the main controller. The contribution of the differential term of the reconstructing equation is then reinstated when the speed exceeds a pre-defined value.

The third term of the reconstruction, that is the Va-Vb term is generated by the two blocks SUB and B-PWM. At any instant, there exist two bytes at the inputs of the SUB block, namely B_INA and B_INB, which are generated by the AMPR block shown in FIGS. 10 and 11. These two bytes represent the coded digital values whose amplitude may be modulated or in any case pre-established to be applied to the two terminals A and B of the respective motor's windings.

The block SUB outputs the byte difference of B_INA and B_INB. This difference is converted by the byte/PWM converter block BPWM in a modulated digital signal PWM of high frequency (commonly greater than 100 khz), whose low and high levels are respectively shifted to Vcc/N=Vcc/4 and to 3/NVcc=3/4Vcc, respectively where Vcc is the supply voltage supply of the output stage. This level shift serves to generate a signal, referred to the voltage Vcc/2, having an amplification rate factor of N=4.

It is desirable for this signal to possess a relatively high frequency (>100 Khz) so that the influence of the PWM filter on the signal reconstruction process may be relatively low. In practice the Σ and PWMFILTER blocks produce a reconstructed BEMF signal, defined in the scheme as BEMF_REC.

The block SQUARE&SHIFT generates the signal ZC_SHIFT starting from a ZC signal and introducing a proper anticipation or delay by means of the ZC_REC block based on the value contained in a shift register REG_SHIFT, whose content is continuously updated by the TORQUE OPTIMIZER, depicted in FIGS. 10 and 11. The function and architecture of such a TORQUE OPTIMIZER are disclosed in the prior European Patent Application No 96830190.3, whose content is herein incorporated by reference.

Figure 13:
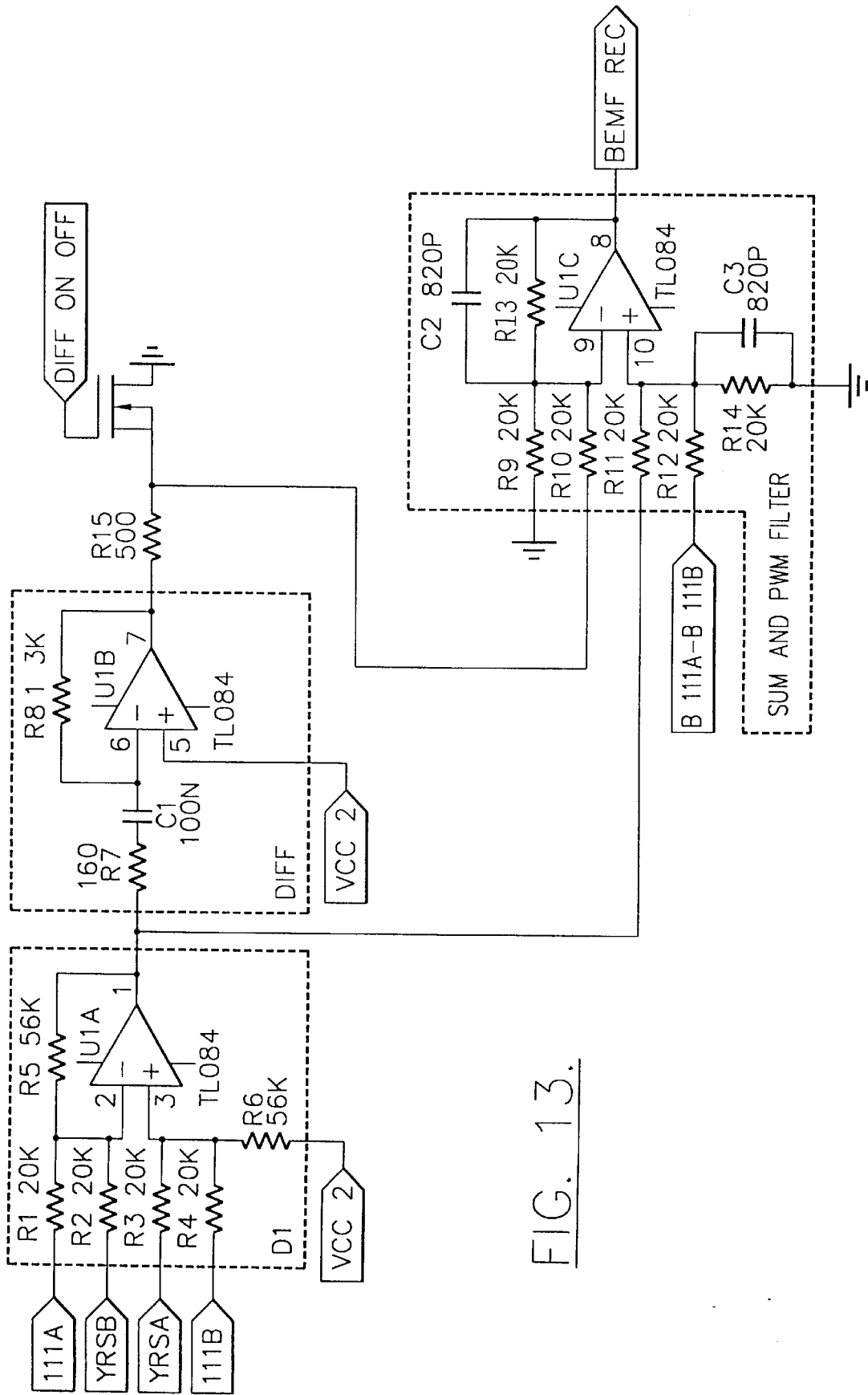
FIG. 13 shows a detail of the blocks D1, DIFF and SUM&PWM FILTER shown in the scheme of FIG. 12b.
Figure 14:
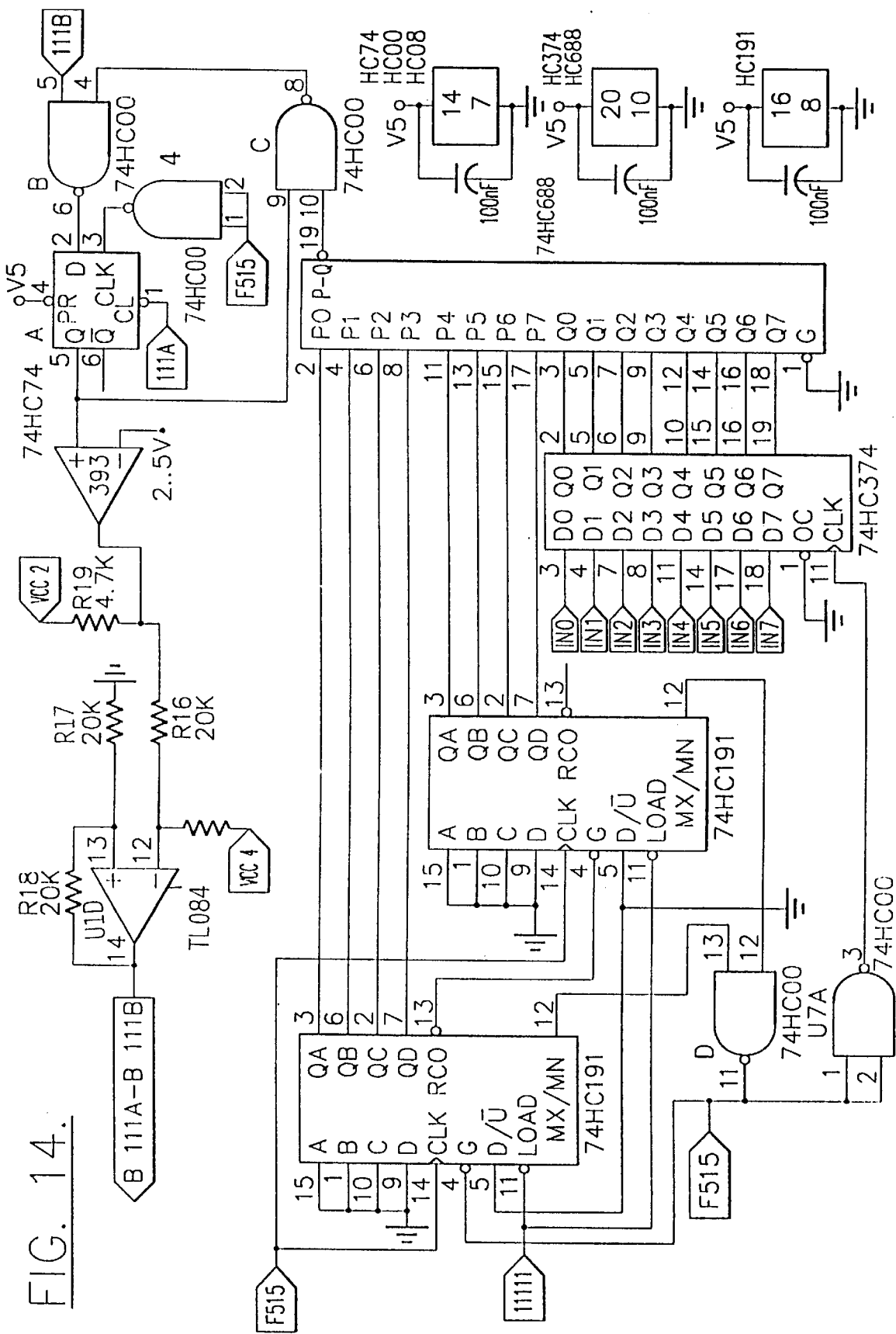
FIG. 14 is a detail of the B-PWM block of the scheme of FIG. 12b.
Figure 15:
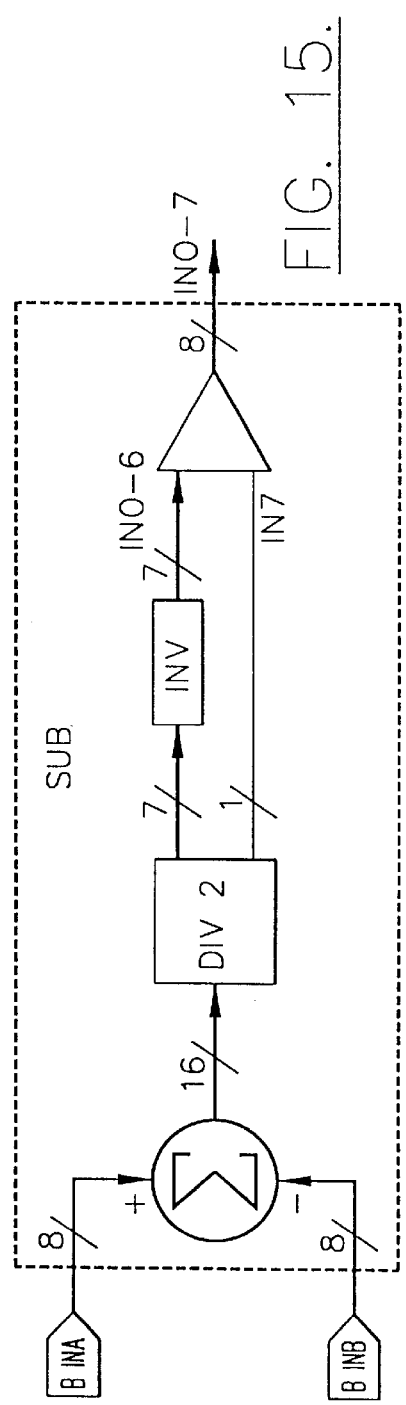
FIG. 15 is a detail of the SUB block of in FIG. 12b.

FIG. 13 illustrates with greater details a BEMF signal reconstruction circuit architecture, according to the invention. FIG. 14 shows an embodiment of the B-PWM conversion circuit, that is of the byte/PWM circuit incorporating also a level shifting circuit of FIG. 12b. FIG. 15 shows an embodiment of the block SUB of FIG. 12b.

Figure 16:
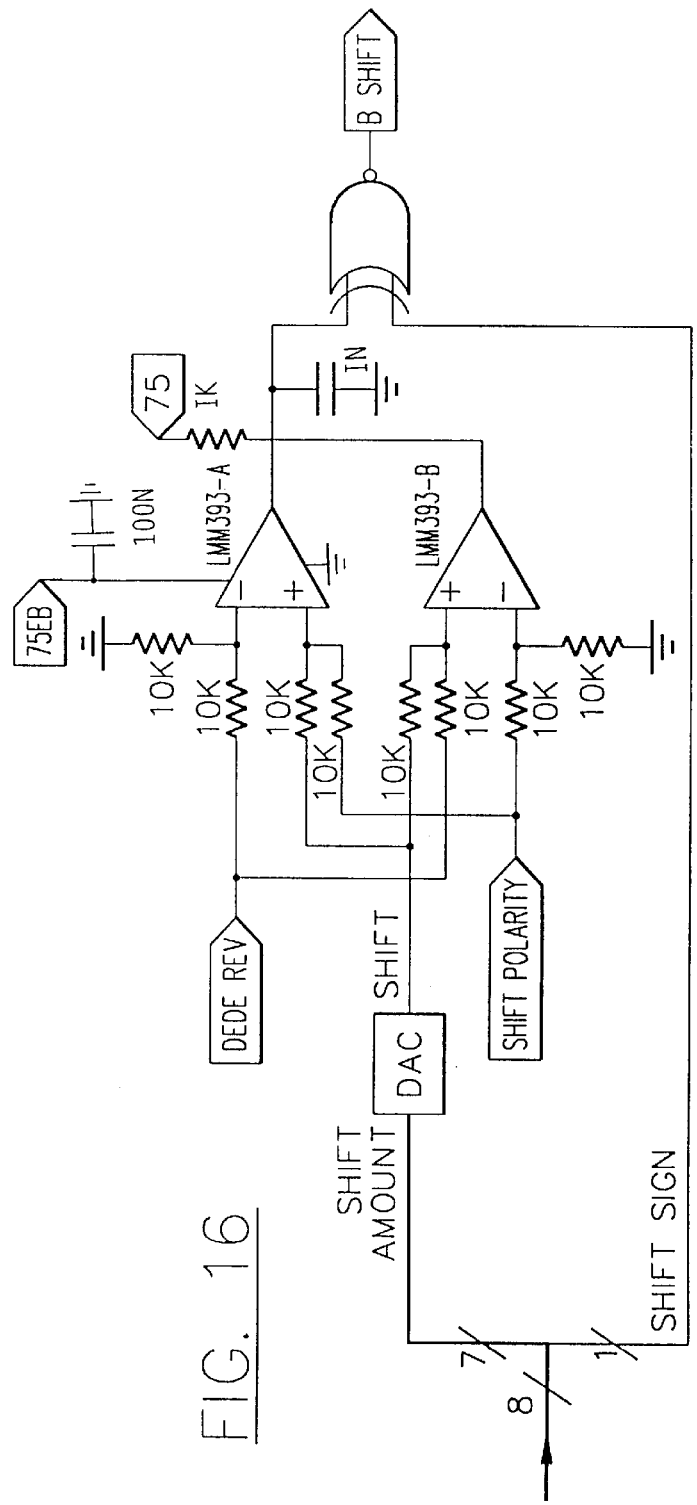
FIG. 16 is a detail of the SQUARE&SHIFT block of FIG. 12b.

FIG. 16 is an embodiment of the circuit block ZC_REC which introduces a delay or anticipation, of continuously updatable value, on the ZC_SHIFT synchronization signal output by the system of the invention.

That which is claimed is:

1. A method of synchronizing phase switching in driving an electric motor according to constant values or pre-defined profiles of voltage with an angular position of a rotor and in a current mode, including monitoring of back-electromotive force (BEMF) signals induced by rotation of the rotor upon the phase windings, the sensing of zero-cross events of the BEMF signals and digital processing of the zero-cross signals to synchronize the phase switching, the method further comprising the steps of:

monitoring currents through two distinct phase windings of the motor;

reconstructing from the currents through the two distinct phase windings and from the constant values or pre-defined profiles of voltage a difference signal between BEMF signals induced in the two windings; and detecting a zero-cross event based upon a pre-defined zero level of the difference signal between the BEMF signals induced in the two windings and producing a zero-cross logic pulse responsive thereto.

2. The method according to claim 1, further comprising the step of introducing a delay or anticipation of the zero-cross logic pulse as defined by an optimizer circuit.

3. The method according to claim 2, wherein the motor is driven in the voltage mode according to pre-defined voltage profiles stored in a static memory as a sequence of digital samples in the form of words of a certain number of bits, and scanned at a reading clock frequency variable as a function of the rotating speed of the motor and in which the difference between the scanned samples of the two phase windings of the motor is converted by a byte/PWM converter circuit into a PWM signal, the low and high levels of which are shifted by a pre-established scale factor.

4. The method according to claim 1, wherein the differential term of the reconstructing step is suppressed until the motor speed remains below a certain value.

5. A method of synchronizing phase switching in driving an electric motor according to constant values or pre-defined profiles of current with an angular position of a rotor in a voltage mode, including monitoring of back-electro-motive force (BEMF) signals induced by rotation of the rotor upon the phase windings, the sensing of zero-cross events of the BEMF signals and digital processing of the zero-cross signals to synchronize the phase switching, the method further comprising the steps of:

monitoring a voltage difference between terminals of two distinct phase windings of the motor;

reconstructing from the monitored voltage difference and from the constant values or pre-defined profiles of current a difference signal between BEMF signals induced in the two windings; and detecting a zero-cross event based upon a pre-defined zero level of the difference signal between the BEMF signals induced in the two windings and producing a zero-cross logic pulse responsive thereto.

6. The method according to claim 5, further comprising the step of introducing a delay or anticipation of the zero-cross logic pulse as defined by an optimizer circuit.

7. The method according to claim 5, wherein the differential term of the reconstructing step is suppressed until the motor speed remains below a certain value.

8. A circuit for reconstructing a BEMF signal induced on the phase windings of a motor driven with constant values or pre-defined profiles of current or voltage, the circuit comprising:

a digital differentiator circuit having inputs for receiving pairs of bytes corresponding to the constant values or instantaneous samples of the pre-defined profiles of the drive signals of two distinct phase windings of the motor and an output for a byte representing a difference of the two input bytes;

a byte/PWM converter circuit having an input connectable to the output of said digital differentiator circuit and an output for a PWM signal whose modulation corresponds to the value of the input byte difference;

first and second sensing resistors in respective first and second phase windings of the two phase windings;

an analog differential stage having differential inputs connected to the first sensing resistor and to the second sensing resistor, and an output for a difference signal of the currents flowing in the two phase windings;

an analog differentiator having an input connected to the output of said analog differential stage; and a summing stage having three distinct inputs coupled to the respective outputs of said analog differential stage, said byte/PWM converter circuit and said analog differentiator, said summing stage having an output for a difference signal between a BEMF induced on the first phase winding and a BEMF induced on the second phase winding.

9. The circuit according to claim 8, wherein said analog differential stage, said analog differentiator and said byte/PWM converter circuit are provided with means for reducing an amplitude of the respective output signals by a factor N greater than one; and wherein said byte/PWM converter circuit comprises a level shifter for the PWM output signal.

10. The circuit according to claim 8, further comprising a control microprocessor; and wherein coupling between the input of said summing stage and the output of said analog differentiator is enabled by said control microprocessor when the speed of the motor exceeds a pre-established value.

11. The circuit according to claim 8, further comprising a low pass filter in cascade with the output of said summing stage for filtering PWM switching noise.

12. A driving system for a multiphase brushless-sensorless motor comprising:

a memory storing at least a pre-defined driving profile of the phase windings of the motor;

an amplitude modulating and reconstructing circuit for the distinct phase windings of the motor;

a battery of byte/PWM converters for converting the current digital values of the pre-defined profiles for the different phase windings of the motor into as many PWM signals;

a multiplexer for the PWM signals to be fed to a driving power stage of the phase windings of the motor;

a regulating circuit of the motor speed rotation;

a torque optimizer cooperating with said regulating circuit;

a control of scanning frequency of said memory;

circuit means for monitoring the current through two of the phase windings of the motor; and reconstructing circuit means for reconstructing at least a BEMF signal induced by the rotation of the rotor on the phase windings, for detecting the crossing from the reconstructed BEMF of a pre-defined level, and for generating a zero-cross pulse for synchronizing the scanning of the digital samples of said pre-defined driving profile.

13. The driving system according to claim 12, wherein said reconstructing circuit means comprises:

a byte/PWM converter circuit having an input connectable to the output of a digital differentiator circuit and an output for a PWM signal whose modulation corresponds to the value of the input byte difference;

first and second sensing resistors in respective first and second phase windings of the two phase windings;

an analog differential stage having differential inputs connected to the first sensing resistor and to the second sensing resistor, and an output for a difference signal of the currents flowing in the two phase windings;

an analog differentiator having an input connected to the output of said analog differential stage; and a summing stage having three distinct inputs coupled to the respective outputs of said analog differential stage, said byte/PWM converter circuit and said analog differentiator, said summing stage having an output for a difference signal between a BEMF induced on the first phase winding and a BEMF induced on the second phase winding.

14. The driving system according to claim 13, wherein said analog differential stage, said analog differentiator and said byte/PWM converter circuit are provided with means for reducing an amplitude of the respective output signals by a factor N greater than one; and wherein said byte/PWM converter circuit comprises a level shifter for the PWM output signal.

15. The driving system according to claim 13, further comprising a control microprocessor; and wherein coupling between the input of said summing stage and the output of said analog differentiator is enabled by said control microprocessor when the speed of the motor exceeds a pre-established value.

16. The driving system according to claim 13, further comprising a low pass filter in cascade with the output of said summing stage for filtering PWM switching noise.

* * * * *

UNITED STATES PATENT AND TRADEMARK OFFICE
CERTIFICATE OF CORRECTION

PATENT NO.  : 5,838,128
DATED       : November 17, 1998
INVENTOR(S) : Giuseppe Maiocchi and Marco Viti It is certified that error appears in the above-identified patent and that said Letters Patent is hereby corrected as shown below:

On the title page, item [73] :

Strike:    " SGS-Thomson Microelectronics S.r.I. "

Insert:    -- SGS-Thomson Microelectronics S.r.l. --

Column 9, Line 4    Strike:    "back-electro-motive"

Insert:    --"back-electromotive--.

Signed and Sealed this

Twenty-seventh Day of July, 1999

Attest:

Q. TODD DICKINSON

*Attesting Officer*    *Acting Commissioner of Patents and Trademarks*